US012113927B2

(12) United States Patent
Shimomura et al.

(10) Patent No.: US 12,113,927 B2
(45) Date of Patent: Oct. 8, 2024

(54) MULTIPLE DWELLING HOUSE INTERPHONE SYSTEM

(71) Applicant: Aiphone Co., Ltd., Nagoya (JP)

(72) Inventors: Yuta Shimomura, Nagoya (JP); Masashi Hattori, Nagoya (JP); Ryoji Uno, Nagoya (JP); Kimiaki Fujishima, Nagoya (JP)

(73) Assignee: AIPHONE CO., LTD., Nagoya (JP)

( * ) Notice: Subject to any disclaimer, the term of this patent is extended or adjusted under 35 U.S.C. 154(b) by 37 days.

(21) Appl. No.: 17/654,074

(22) Filed: Mar. 9, 2022

(65) Prior Publication Data

US 2022/0294909 A1 Sep. 15, 2022

(30) Foreign Application Priority Data

Mar. 11, 2021 (JP) ................................ 2021-039573

(51) Int. Cl.
*H04M 13/00* (2006.01)
*G06F 3/0481* (2022.01)

(52) U.S. Cl.
CPC .......... *H04M 13/00* (2013.01); *G06F 3/0481* (2013.01)

(58) Field of Classification Search
CPC ........ H04M 13/00; H04M 9/02; G06F 3/0481
See application file for complete search history.

(56) References Cited

U.S. PATENT DOCUMENTS 7,298,835 B1 * 11/2007 Perry ................ H04M 3/42153
379/201.01
10,616,420 B2 * 4/2020 Yamakawa ............. H04M 9/02
(Continued)

FOREIGN PATENT DOCUMENTS

JP 2005-244432 A 9/2005
JP 2007-266978 A 10/2007
JP 2008-160472 A 7/2008

OTHER PUBLICATIONS

Kawai Yosuke (JP2007266978 "Multiple Dwelling House Intercom System") (Year: 2007).*

(Continued)

*Primary Examiner* — Solomon G Bezuayehu
(74) *Attorney, Agent, or Firm* — BURR PATENT LAW, PLLC

(57) ABSTRACT

A multiple dwelling house interphone system includes a collective entrance machine, a dwelling room master device, and a management master device. The collective entrance machine is for calling a visit destination by a visitor. The dwelling room master device is for responding to the call by a dweller. The management master device is for speaking with the dweller by a manager. The management master device includes a speech permissibility storage section and a speech control section. The speech permissibility storage section registers a permissibility of calling and speaking to the dwelling room master device for each dwelling unit. The speech control section controls the calling and speaking. The speech control section does not perform the calling control when a calling operation by the management master device is performed towards the dwelling room master device of a dwelling unit registered as "unpermitted" in the speech permissibility storage section.

5 Claims, 5 Drawing Sheets

(56) References Cited

U.S. PATENT DOCUMENTS

| | | | |
|---|---|---|---|
| 2007/0143422 A1* | 6/2007 | Cai | H04M 3/436 |
| | | | 709/206 |
| 2007/0271364 A1* | 11/2007 | Liu | H04M 11/04 |
| | | | 709/223 |
| 2008/0146200 A1* | 6/2008 | Martin | H04M 3/436 |
| | | | 455/414.1 |
| 2009/0041222 A1* | 2/2009 | Guven | H04M 1/663 |
| | | | 379/210.02 |
| 2012/0102409 A1* | 4/2012 | Fan | H04W 4/00 |
| | | | 715/738 |
| 2012/0134484 A1* | 5/2012 | Prasad | H04L 65/1079 |
| | | | 379/201.02 |
| 2013/0130656 A1* | 5/2013 | Selph | H04N 21/41407 |
| | | | 455/412.1 |
| 2015/0334346 A1* | 11/2015 | Cheatham, III | H04N 21/4367 |
| | | | 348/14.05 |
| 2016/0198287 A1* | 7/2016 | Hulusi | H04W 12/08 |
| | | | 455/41.1 |
| 2017/0338605 A1* | 11/2017 | Payet-Burin | H02G 3/00 |
| 2018/0295243 A1* | 10/2018 | Shimomura | H04M 9/02 |
| 2019/0289133 A1* | 9/2019 | Kai | H04M 9/06 |
| 2021/0127435 A1* | 4/2021 | Yamakawa | G08B 7/06 |
| 2021/0377389 A1* | 12/2021 | Combellas | H04M 3/4365 |

OTHER PUBLICATIONS

Extended European Search Report dated Jul. 25, 2022 (Application No. 22161203.9).

\* cited by examiner

MULTIPLE DWELLING HOUSE INTERPHONE SYSTEM

BACKGROUND OF INVENTION

Technical Field

The disclosure relates to a multiple dwelling house interphone system used by a visitor for calling a dweller in a multiple dwelling house.

Background Art

The multiple dwelling house interphone system having a configuration that includes a collective entrance machine used by a visitor for calling a dweller, a dwelling room master device used by the dweller for responding to the call, and further, a management master device installed in a manager room, has been widely used.

The management master device can call the dwelling room master device of a selected dwelling unit by performing a calling operation of selecting the dwelling unit by inputting a dwelling unit number or the like, thereby allowing speaking with the dweller. The dweller can also call the manager from the dwelling room master device and speak with the manager see JP-A-2005-244432, for example.

As described above, the conventional multiple dwelling house interphone system is capable of calling and/or speaking to any dwelling unit from the management master device. However, some of the dwellers do not want to be called by the manager, and it is desirable to provide a system in which a dweller can call a manager while the manager is not allowed to call the dweller.

Therefore, in consideration of the problem, it is an object of the disclosure to provide a multiple dwelling house interphone system in which a management master device is incapable of calling and/or speaking to a specific dwelling room master device.

SUMMARY OF THE INVENTION

In order to solve the above-described problem, there is provided a multiple dwelling house interphone system according to a first aspect of the disclosure. The multiple dwelling house interphone system includes a collective entrance machine, a dwelling room master device, and a management master device. The collective entrance machine is for a visitor to call a visit destination. The dwelling room master device is for the dweller to respond to the call. The management master device is for the manager to speak with the dweller. The management master device includes a speech permissibility storage section and a speech control section. The speech permissibility storage section registers a permissibility of calling and speaking with the dwelling room master device for each dwelling unit. The speech control section controls the calling and speaking. The speech control section does not perform the calling control when a calling operation by the management master device is performed towards the dwelling room master device of a dwelling unit registered as "unpermitted" in the speech permissibility storage section.

With the configuration, calling is not performed towards the dwelling room master device of the dwelling unit set as "unpermitted" for calling even when the calling operation is performed from the management master device. Accordingly, dwellers who do not want to be called by the manager can set the permission to "unpermitted" in order to avoid unpleasant feelings.

In a second aspect of the disclosure, which is in the configuration according to first aspect, the management master device includes a register control section that causes the display section of a dwelling room master device to display a selection button for the dweller. The dweller may respond with a choice of "permitted" or "unpermitted" when a predetermined operation to change a registered content in the speech permissibility storage section is performed. The display section is also an operation section of the dwelling room master device of a dwelling unit for which the change of registered content is intended. The register control section updates the registered content in the speech permissibility storage section in accordance with the reply content from the selection button.

With the configuration, for example, when a new dweller moves in, the permissibility setting of the calling and speaking needs to be changed. However, because the control operates in such a way as to obtain a permission from the dweller while the setting is being changed, it is unnecessary for the operator to perform an additional conformational operation with the dweller.

According to a third aspect of the disclosure, which is in the configuration according to the first aspect, the dwelling room master device includes a speech permitted master device storage section, a calling operation section, and a master device speech control section. The speech permitted master device storage section enables calling and speaking with another specific dwelling room master device. The calling operation section performs a calling operation to the specific dwelling room master device. The master device speech control section controls the calling and speaking. Collectively, they enable calling and speaking with a specific dwelling room master device. With the configuration, because calling and speaking with a specific dwelling room master device is enabled, for example, when parents and a child live separately in different dwelling units in a multiple dwelling house as a parent household and a child household, they can conveniently speak with each other using the dwelling room master devices.

According to the invention, calls towards the dwelling room master devices of the dwelling units registered with the "unpermitted" setting are not performed even when the calling operation is performed from the management master device. Accordingly, dwellers who do not want to be called by the manager can set the permission setting to "unpermitted" in order to avoid unpleasant feelings.

DETAILED DESCRIPTION

Figure 1:
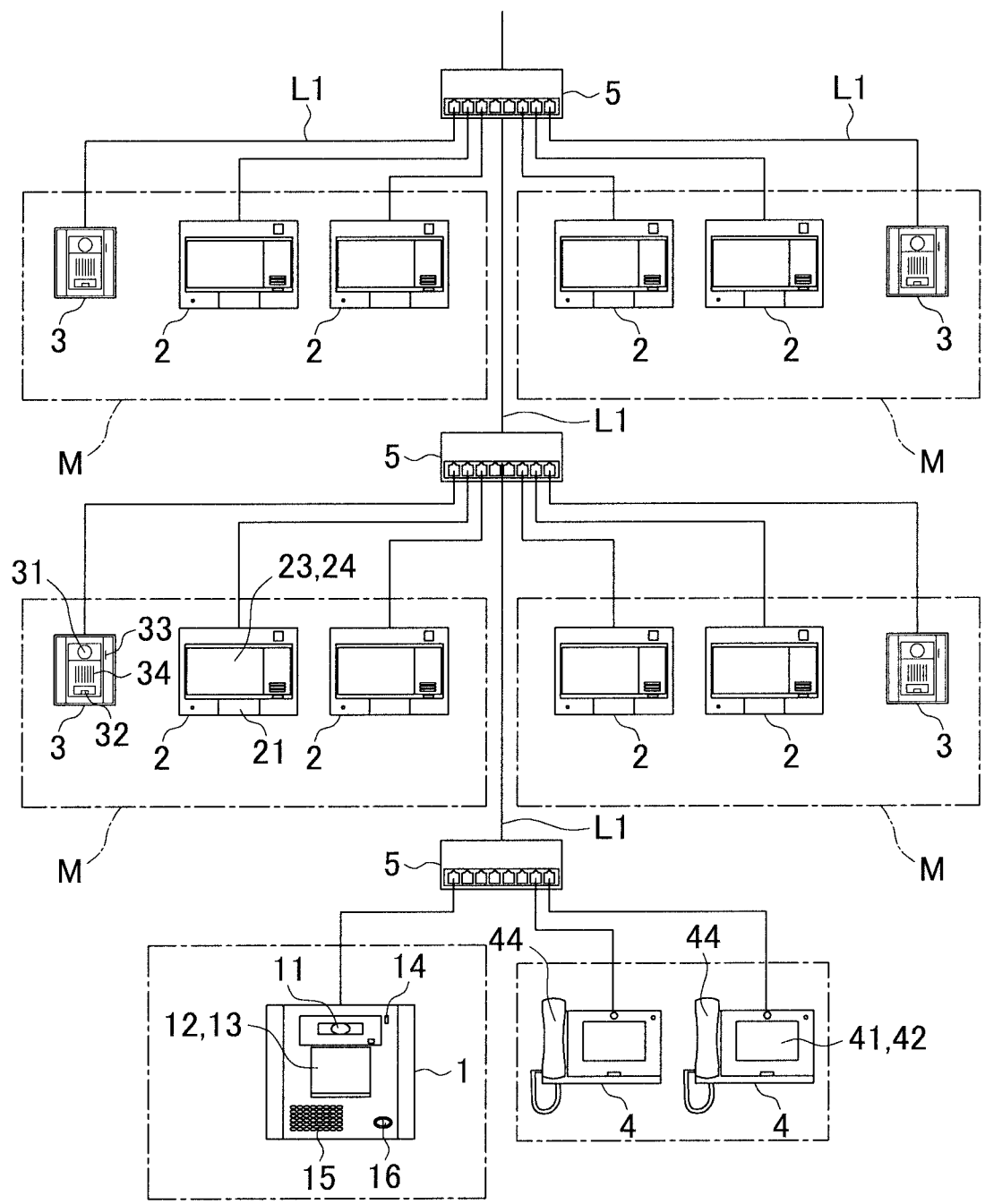
FIG. 1 is a block diagram illustrating an exemplary multiple dwelling house interphone system according to the invention.

The following describes embodiments in detail with reference to the drawings. FIG. 1 is a block diagram illustrating an exemplary multiple dwelling house interphone system according to the disclosure. The multiple dwelling house interphone system includes a collective entrance machine 1, dwelling room master devices 2, entrance slave devices 3, management master devices 4, and the like. The collective entrance machine 1 is installed at an entrance of a multiple dwelling house and used by a visitor to call a dweller. The dwelling room master devices 2 are installed in individual dwelling units and used for responding to the call from the collective entrance machine 1. The entrance slave devices 3 are installed at entrances of the individual dwelling units and used for calling the dwellers. The management master devices 4 are installed in a manager room and used for speaking with the dwellers and the like.

While at least one dwelling room master device 2 or at least one management master device 4 is installed in the individual dwelling unit or the manager room, a configuration in which two of both are installed at each location is indicated here. Reference character 5 denotes HUBs, and the devices are mutually connected by a LAN via communication lines L1. The communication between the devices is performed by an Internet Protocol (IP).

The collective entrance machine 1 includes a camera 11, an operation section 12, a display section 13, a microphone 14 and a speaker 15, a call button 16, and the like. The camera 11 obtains an image of a visitor. The operation section 12 is used for selecting or inputting the dwelling unit to be called. The display section 13 displays a calling destination and the like. The microphone 14 and the speaker 15 are used for speaking.

The dwelling room master device 2 includes a speech button 21 for responding to the calls, a microphone and a speaker for speaking, a monitor 23 that displays the video image taken by the camera 11, an operation section 24 for performing various operations, and the like. The operation section 24 consists of a touch panel and is integrated with the monitor 23.

The entrance slave device 3 includes a slave device camera 31 for obtaining an image of a visitor, a call button 32, and a microphone 33 and a speaker 34 used for speaking.

Figure 2:
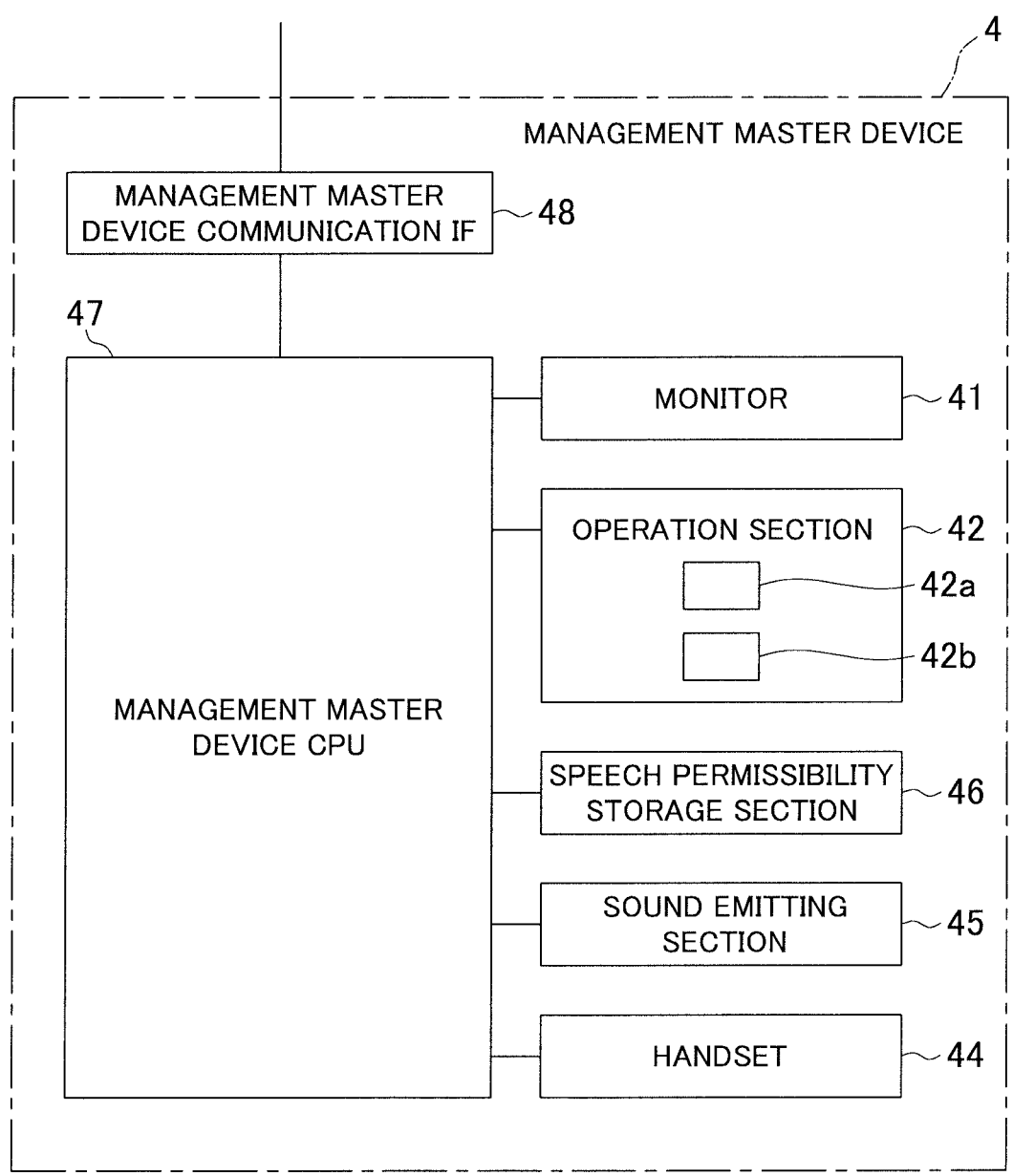
FIG. 2 is a block diagram of a management master device.

FIG. 2 is a block diagram of the management master device 4. As illustrated in FIG. 2, the management master device 4 includes a monitor 41, an operation section 42, a handset 44, a sound emitting section 45, a speech permissibility storage section 46, a management master device CPU 47, a management master device communication IF 48, and the like. The monitor 41 includes an LCD that displays a video image obtained by the camera 11 of the collective entrance machine 1 and displays various information. The operation section 42 is integrally formed with the monitor 41 and includes a touch panel. The handset 44 is used for speaking. The sound emitting section 45 emits a call sound and a warning sound. The speech permissibility storage section 46 registers speech permissibility information for each dwelling unit. The management master device CPU 47 controls the management master device 4. The management master device communication IF 48 communicates with the collective entrance machine 1 and the dwelling room master device 2.

The following describes operations of the multiple dwelling house interphone system configured as described above. Note that for operations that are similar to those in a conventional interphone system such as a call to a visit destination from the collective entrance machine 1 by a visitor, a call to a dweller from the entrance slave device 3, a response by a dweller receiving the call using the dwelling room master device 2 while watching the video image obtained by the camera 11 or the slave device camera 31, the explanations are omitted.

Here, a description will be given of an operation of setting a call to "permitted" or "unpermitted" towards the individual dwelling room master device 2 from the management master device 4. The setting includes a collective setting operation in which the permissibility setting is collectively performed towards all of the dwelling units and an individual setting operation in which the permissibility setting is individually performed. The collective setting operation is performed at the start up of the interphone system, and the individual setting operation is performed when a dweller moves out and a new dweller moves in.

The collective setting operation is performed by displaying a collective setting screen (not illustrated) through a predetermined operation of the operation section 42. When a collective inquiry button 42a is displayed on the collective setting screen and the button is operated, the management master device CPU 47 performs a control to collectively transmit a signal to inquire whether to allow setting the call to be permitted or not to all the dwelling room master devices 2. In the dwelling room master device 2 receiving the inquiry signal, a response operation screen for making a response is displayed in the operation section 24 of monitor 23.

Figure 3:
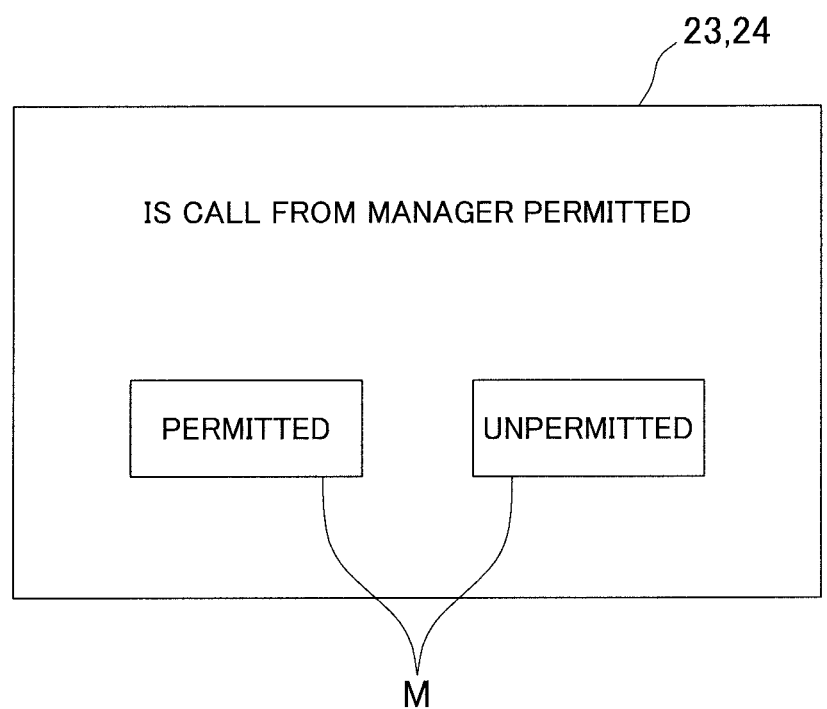
FIG. 3 is an explanatory diagram of a dwelling room master device displaying a selection button.

FIG. 3 is an explanatory diagram of the response operation screen, and two selection buttons M of "PERMITTED" and "UNPERMITTED" are displayed. When either of the selection buttons M is tapped on the display, information indicated by the selected button is sent in response to the management master device 4.

The management master device 4 receiving the replies from individual dwelling room master devices 2 registers the replied information in the speech permissibility storage section 46. The information indicating that the calling and/or speaking is permitted is saved for the dwelling units replying with "permitted," and the information indicating that the calling and/or speaking is not permitted is saved for the dwelling units replying with "unpermitted."

Meanwhile, the individual setting operation is performed by displaying the individual setting screen (not illustrated). In the individual setting screen, an individual inquiry button 42b and an input section for a dwelling unit number of an inquiry destination are displayed. When the dwelling unit number is input and the individual inquiry button 42b is tapped, two selection buttons M of "permitted" and "unpermitted" are displayed on the monitor 23 of the dwelling room master device 2 in a manner similar to the collective setting operation described above.

When the dweller selects either of the two selection buttons M and performs the response operation, the information in the speech permissibility storage section 46 is updated and registered in accordance with information indicated by the selected button.

The management master device 4 performs a calling control in accordance with the permissibility information set as described above. To the dwelling room master device 2 in which the call has been set as "unpermitted", the call is not performed even when the dwelling unit number is input to select the dwelling unit and the calling operation is performed. Meanwhile, to the dwelling room master device 2 in which the call is set to be "permitted", the calling control is performed in response to the calling operation, the dwelling room master device 2 to which the calling is performed emits the call sound, and a speech path is formed when the response operation is performed. Thus, speaking between the manager and the dweller is enabled.

The calling and speaking to the management master device 4 from the dwelling room master device 2 can be performed irrespective of the permissibility in the setting.

Thus, calls to the dwelling room master device 2 of the dwelling unit set as "unpermitted" are not performed even when the calling operation is performed from the management master device 4. Accordingly, dwellers who do not want to be called by the manager can set the permission setting to "unpermitted" in order to avoid unpleasant feelings. For example, when a new dweller moves in, the permissibility setting of the calling and speaking needs to be changed. However, since the control operates to obtain a permission from the dweller while the setting is being changed, it is unnecessary for the operator to perform an additional conformational operation with the dweller.

Figure 4:
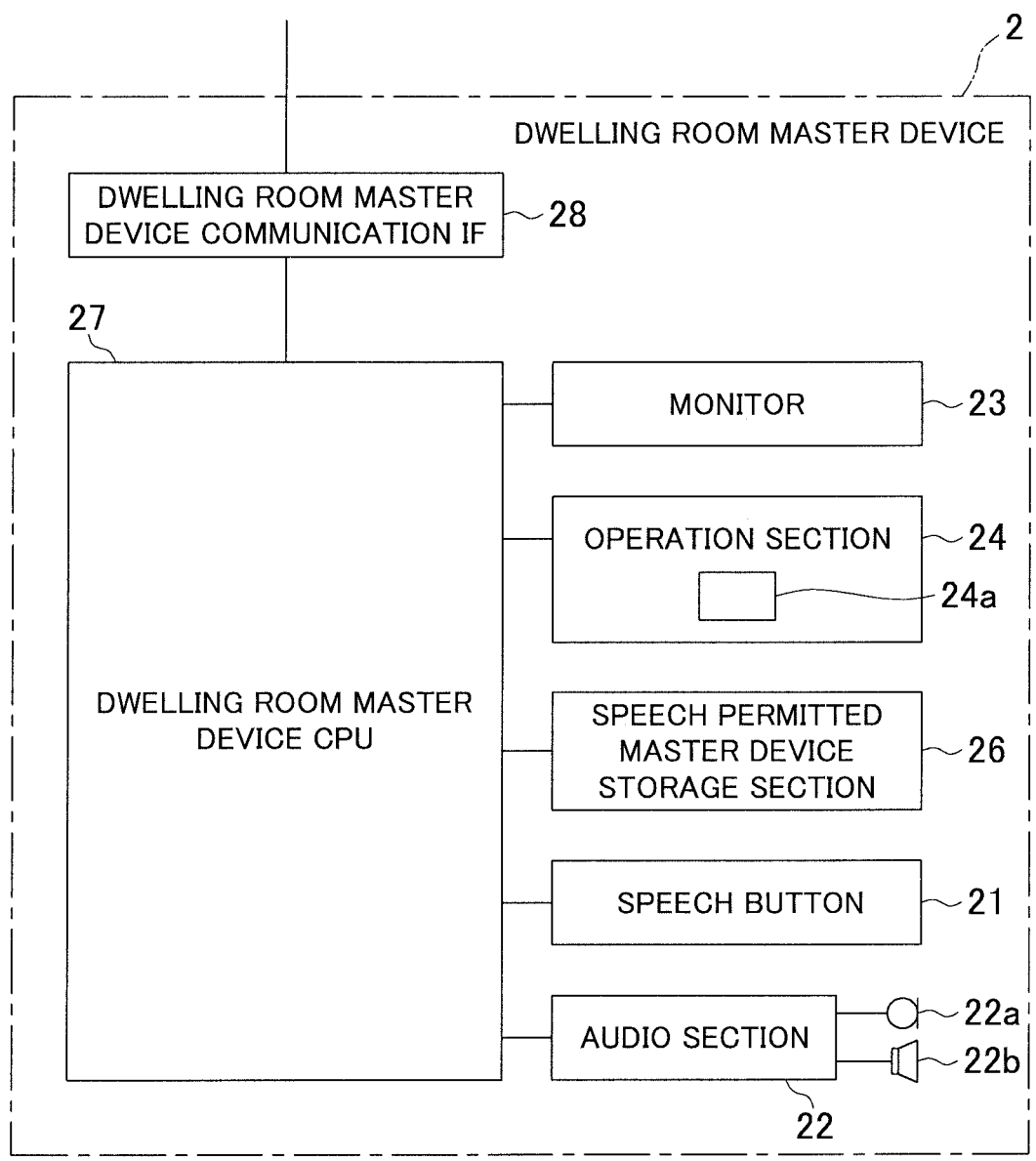
FIG. 4 is a block diagram of the dwelling room master device.

FIG. 4 illustrates a block diagram of a dwelling room master device 2 in another example of a multiple dwelling house interphone system. Here, in addition to the above-described configuration in which the dwelling room master devices 2 that can be called/spoken to from the management master device 4 are restricted, speech between some of the dwelling room master devices 2 is enabled.

Since the overall configuration of the multiple dwelling house interphone system and the configuration of the management master device 4 are similar to the configurations illustrated in FIG. 1, the explanations are omitted. The configuration and the operation of the dwelling room master device 2 will be described below.

As illustrated in FIG. 4, the dwelling room master device 2 includes a speech button 21, an audio section 22 including a microphone 22a and a speaker 22b, a monitor 23 that displays a video image obtained by the camera 11, an operation section 24 integrated with the monitor 23, and further, a speech permitted master device storage section 26. Reference character 27 is a dwelling room master device CPU that controls the dwelling room master device 2, and reference character 28 is a dwelling room master device communication IF that communicates with other devices.

The operation section 24 includes a master device call button (not illustrated) and a calling operation section 24a is displayed when the master device call button is operated.

Figure 5:
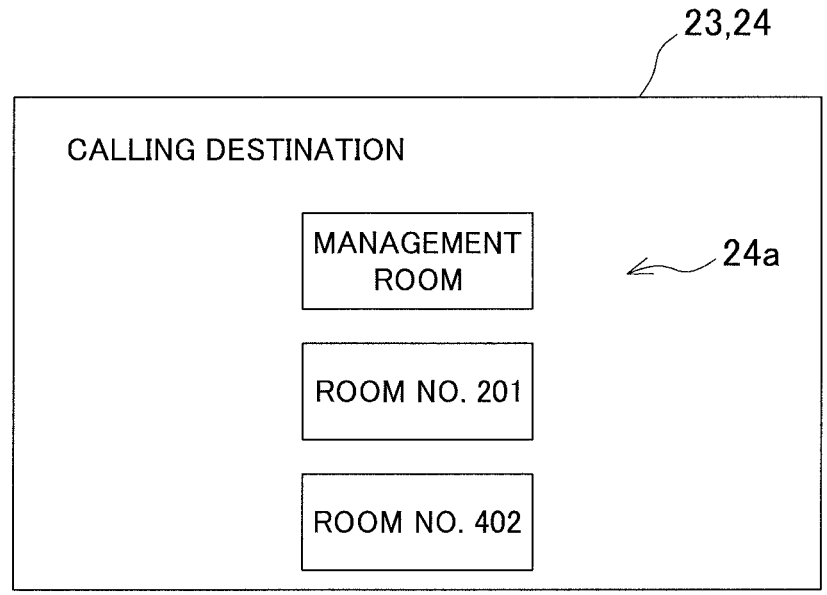
FIG. 5 is an explanatory diagram of a calling operation section for calling a dwelling room master device from another dwelling room master device.

FIG. 5 illustrates calling operation section 24a in a state where individual call buttons for calling dwelling units 201 and 402 in addition to the management master device 4 are displayed. When any of the call buttons is tapped, the dwelling room master device CPU 27 performs a control to call the tapped dwelling unit or manager room, and speaking is enabled when the response operation is received.

Multiple (for example, four) dwelling room master devices 2 can be set to be permitted for calling, and the setting is performed by displaying the individual setting screen in a manner similar to the above-described individual setting of the management master device 4 (not described in detail). In the individual setting operation, when a permission signal from the inquiry destination dwelling room master device 2 is received, the dwelling room master device CPU 27 performs a control to register the dwelling unit as the inquiry destination in the speech permitted master device storage section 26, and the call button illustrated in FIG. 5 is generated.

As described above, because calling and/or speaking with a specific dwelling room master devices 2 is enabled, for example, when parents and a child live separately in different dwelling units in a multiple dwelling house as a parent household and a child household, they can conveniently speak to each other using the dwelling room master devices.

While the multiple dwelling house interphone system has a configuration in which the communication between the devices is performed by the IP communication, the technique of the invention is applicable to a conventional configuration in which a controller to control the communication between the devices is disposed of and the devices are mutually connected by a two-wire transmission line.

The invention claimed is:

1. A multiple dwelling unit house interphone system comprising:
   a collective entrance machine for a visitor to place a call to a dwelling unit visit destination;
   a dwelling room master device for each dwelling unit for a dweller to respond to the call from the visitor; and
   a management master device for a manager to communicate with the dwelling room master device for each dwelling unit,
   wherein each dwelling room master device includes a master device speech control section and an operation section having a screen,
   wherein the management master device includes
      a speech permissibility storage section that registers a permissibility setting, indicating whether communicating with the dwelling room master device is permitted or unpermitted, for each dwelling unit when the management master device is a sender that performs a calling operating to the dwelling room master devices,
      a speech control section having a calling control that controls calling and/or speaking, and
      a register control section that causes the operation section to display a selection button to select a reply of permitted or unpermitted,
   wherein the register control section causes the screen of each dwelling room master device to display the selection button and registers the permissibility setting for the dwelling unit in the speech permissibility storage section according to the selected reply for each dwelling unit,
   wherein when the management master device performs the calling operation to the dwelling room master devices, the speech control section of the management master device performs the calling control for the dwelling room master devices of the dwelling units that have a permissibility setting registered as permitted in the speech permissibility storage section of the management master device, and the calling to the dwelling room master device is performed, while the speech control section of the management master device does not perform the calling for the dwelling room master devices of the dwelling units that have a permissibility setting registered as unpermitted in the speech permissibility storage section of the management master device, and thereby calling to the dwelling room master device is not performed, and
   wherein when the dwelling room master device performs a calling operation to the management master device, the master device speech control section of the dwelling room master device performs the calling operation for the management master device and the calling from the dwelling room master device to the management master device is performed even if the permissibility setting for that dwelling room master device registered in the speech permissibility storage section of the management master device is set as unpermitted.

2. The multiple dwelling unit house interphone system according to claim 1, wherein when an operation to change a registered content in the speech permissibility storage section is performed by the operation section, the register control section causes the operation section of the operated dwelling room master device to display the selection button, and updates the registered content in the speech permissibility storage section according to the reply selected from the selection button.

3. The multiple dwelling unit house interphone system according to claim 1, wherein the dwelling room master device includes:
- a speech permitted master device storage section that enables the calling and/or speaking from one of the dwelling room master devices to another specific one of the dwelling room master devices; and
- a calling operation section that performs the calling operation to the specific one of the dwelling room master devices, wherein the calling and/or speaking to the specific one of the dwelling room master devices is enabled.

4. The multiple dwelling unit house interphone system according to claim 2, wherein the dwelling room master device includes:
- a speech permitted master device storage section that enables the calling and/or speaking from one of the dwelling room master devices to another specific one of the dwelling room master devices; and
- a calling operation section that performs the calling operation to the specific one of the dwelling room master devices, wherein the calling and/or speaking to the specific one of the dwelling room master devices is enabled.

5. The multiple dwelling unit house interphone system according to the claim 1, wherein the dwelling room master device has a management room call button for calling the management master device.

* * * * *